Inventor:
John L. Ferguson.
By
Jones, Addington, Ames & Seibold
Attorneys.

Jan. 10, 1933. J. L. FERGUSON 1,893,496
SEALER GUIDE ADJUSTING MEANS
Filed May 23, 1930 2 Sheets-Sheet 2
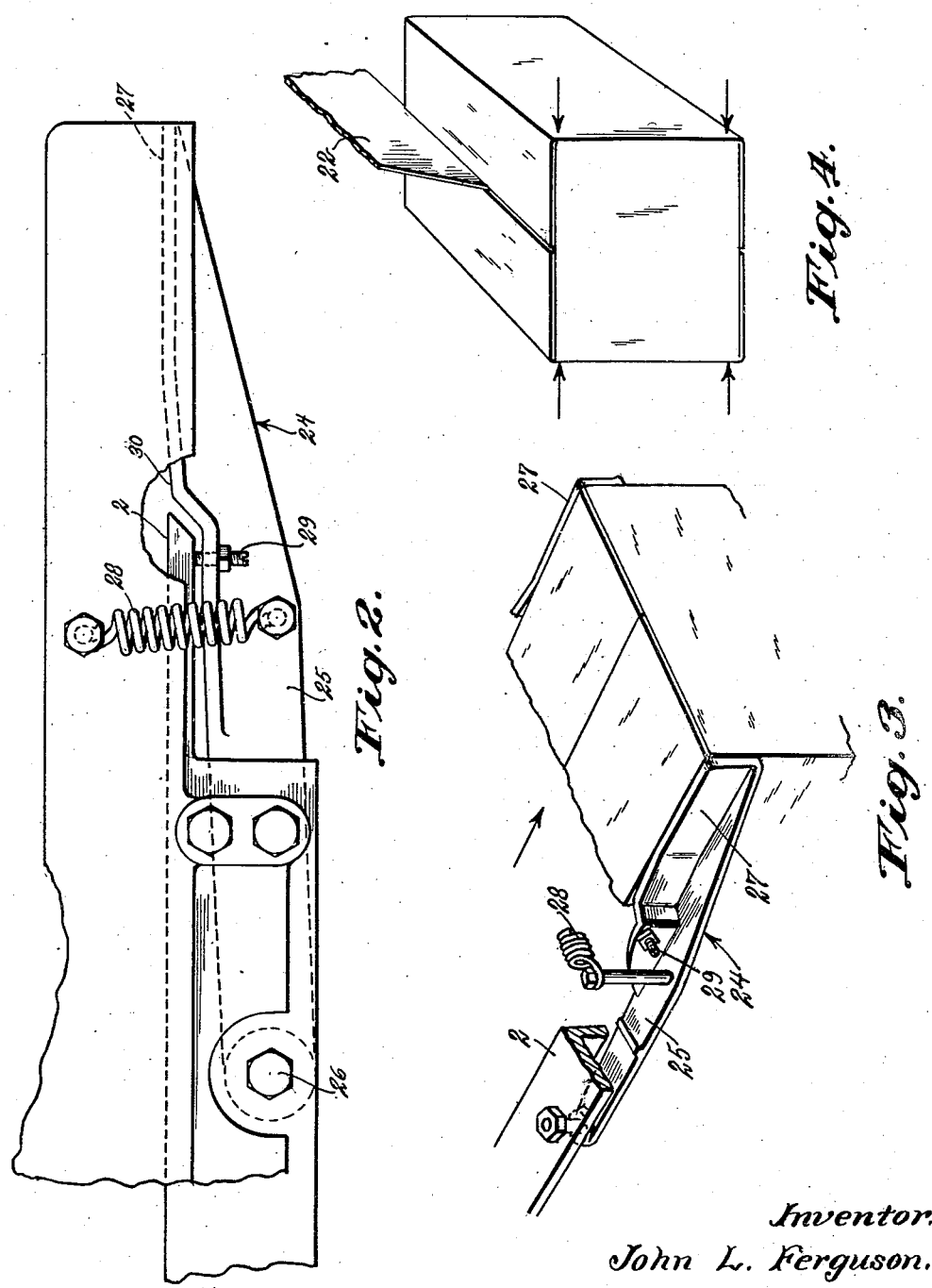
Inventor:
John L. Ferguson.
By
Jones, Addington, Ames + Seibold.
Attorneys.

Patented Jan. 10, 1933

1,893,496

UNITED STATES PATENT OFFICE

JOHN L. FERGUSON, OF JOLIET, ILLINOIS, ASSIGNOR TO J. L. FERGUSON COMPANY, OF JOLIET, ILLINOIS, A CORPORATION OF ILLINOIS

SEALER GUIDE ADJUSTING MEANS

Application filed May 23, 1930. Serial No. 454,860.

My invention relates to container sealer guides and more particularly to adjustable means for guiding containers during their passage through container sealers, which latter sealers are provided with supplemental guide means adjacent the exit end of the sealer.

In container sealers of the type in which one embodiment of my invention is shown and will be later described, guide bars or rails are usually provided adjacent parallel corners of the container, for guiding the container through the sealer during the sealing opeartion. The containers are moved through the sealer by a conveyor and are guided by the rails to the discharge or exit end of the machine where they are delivered to conveyor belts which maintain a suitable pressure on the freshly glued flaps until the adhesive is dry.

The containers are usually packed with small, previously filled cartons before being passed through the sealer, and the guide rails are so positioned as to allow considerable clearance and to avoid undue friction of the container against the rails which friction may occur on account of slight variation in the size of the containers and to bulging of the sides during the filling and sealing operation.

As the containers are passed through the sealer, the flaps are turned outwardly, an adhesive is applied thereto,—usually by glue rollers,—and they are then sealed by suitable folders, as is well known in the art.

Heretofore, the sealing operation has allowed the inturned adjacent edges of the flaps to be slightly separated after being sealed, due to the bulging of the container, the necessary clearance between the guide rails, and the means used to prevent overlapping of the flaps during the folding operation. The containers are, therefore, discharged from the sealer to the drying conveyor in the above described unsatisfactory condition.

In my invention, I have overcome these and other objections and have also provided a novel means whereby the guide rails are easily adjustable to allow containers of various sizes to be handled in a single machine, together with means simultaneously adjustable with said guides to allow the adjacent edges of the sealed flaps to be snugly pressed together and to retain them in the desired position while the container is being discharged from the machine to any suitable drying conveyor.

My invention also provides a desirable means for retaining a suitable clearance between the rails and any desired size of container during the sealing operation and automatically adjustable means for closing the separated adjacent edges of the freshly sealed flaps snugly together during the movement of the container from the sealer. The latter means automatically compensates for slight variations or allowable tolerances in the size of containers.

Other objects and advantages will be apparent from the specification and the appended claims.

In the drawings:

Fig. 2 is a top plan view of the end of one of the upper guide rails including the supplemental guide and compensating means;

Fig. 3 is a fragmentary perspective view illustrating the relative positions of the supplemental guide members and the moving package, and Fig. 4 is a perspective view of one of the containers after being sealed and before being engaged between the supplemental members, a portion of the means for preventing overlapping of the flaps during the sealing operation being shown in operative position.

Figure 1:
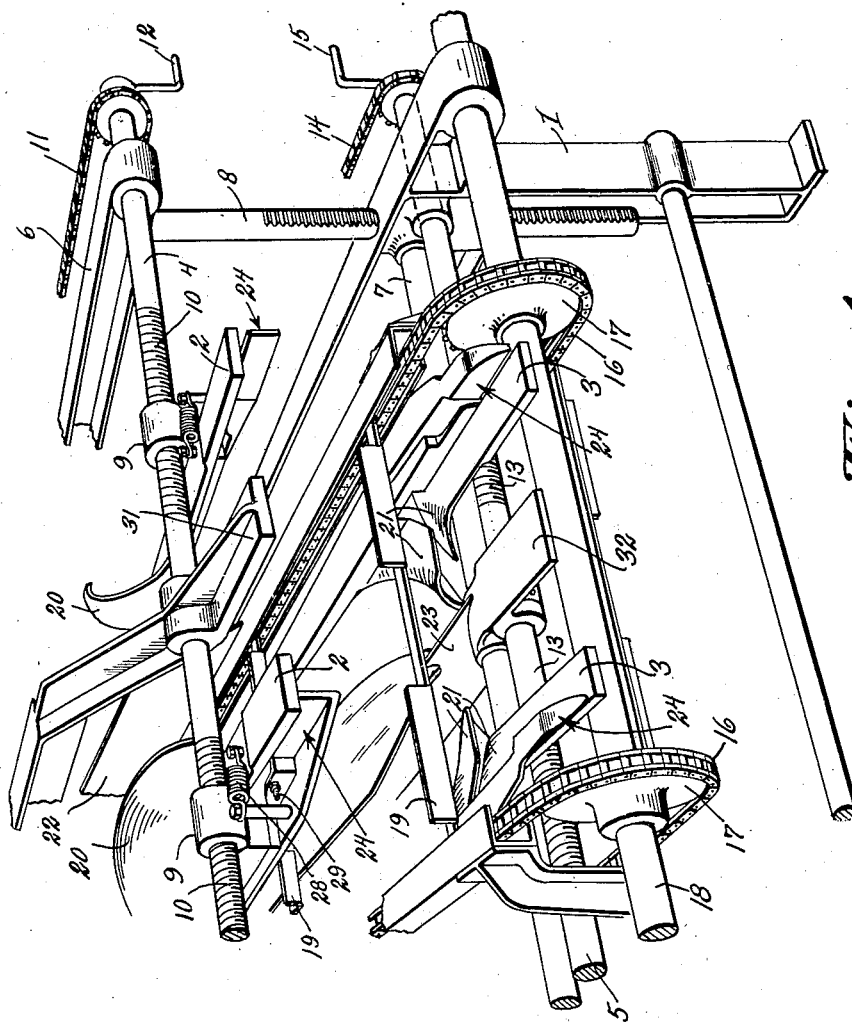
Figure 1 is a fragmentary perspective view of the discharge end of a container sealer embodying my invention.

Referring to the drawings in detail, the embodiment illustrated comprises a frame 1 for supporting the usual container sealer mechanism which may be of any well-known construction and need not be described herein. A plurality of guide rails are longitudinally and adjustably supported, as shown in Fig. 1, and in a position to allow the containers to be guided therebetween. The upper guide rails 2 and the lower rails 3 are mounted on transverse shafts 4 and 5, respectively. The shaft 4 is mounted in side bars 6 and a similar shaft supports the front end of the guide rails 2. This construction forms a rectangular frame which is vertically adjustable by means of a shaft 7 which operatively engages rack posts 8 supporting each corner of the frame.

Bearings 9 on the guide rails 2 engage oppositely threaded portions 10 of the shaft 4, and the shaft is operatively connected to the similar shaft at the front of the machine by a chain 11 on suitable sprockets secured to the shafts. A handle 12 provides means for rotating the shafts and adjusting the lateral position of the guide rails 2 thereon while retaining their parallel alignment.

The lower guide rails 3 are similarly mounted on oppositely threaded portions 13 of the shaft 5 which is mounted in the frame 1 and connected to a similar rail supporting shaft at the front of the machine by means of a chain 14 on suitable sprockets on the shafts. A handle 15 secured to the shaft 5 provides a driving means for the lateral adjustment of the rails 3 in a similar manner to that described for the upper rails 2.

It is evident that with the above described construction, the rails may be accurately and easily adjusted laterally and vertically to conform to the requirements of any size package within the limits of the particular sealer.

The containers are moved through the sealer by means of a conveyor comprising spaced chains 16 on sprockets 17 which latter are secured to a suitable drive shaft 18 mounted in the frame 1 and driven from any desirable power source. Spaced cross bars or flights 19 are secured to the chains for moving the containers through the sealer.

Folder plates 20 are secured to the upper guide rails 2 and are adjustable therewith, the lower rails 3 being provided with similar folder plates 21. When the flaps of any size container are glued and then folded by the upper folder plates 20, the inner edges are prevented from overlapping and held slightly separated by a centrally located plate 22, and in a similar manner a lower plate 23 holds the edges of the lower flaps separated and prevents overlapping, the sealed flaps then being in the position shown in Fig. 4. However, while the container is in this position, the adhesive is not yet dry and if pressure is applied against the edges of the sides of the container after release from the separating plates 22 and 23, and in the direction of the arrows in Fig. 4, the moist adhesive will allow the edges of the flaps to be snugly pressed together, as shown in Fig. 3, in which condition they may be ejected from the sealer, preferably into a conveyor which will retain a pressure on the flaps until the adhesive is thoroughly dry. The snug closing of the flaps is very desirable, as the inturned end ears which are first folded are sometimes short and if the outer flaps are not held together an opening is left in the container.

In order that the flaps may be pressed together immediately after release from the separating plates and before the container is ejected from the sealer, I provide supplemental spring-pressed guide members 24, one of which is mounted on each of the four guide rails 2 and 3. These members are similar in construction, one of them being shown in detail in Figs. 2 and 3, and comprising a bar 25, pivoted on the guide rail at 26, and provided with a container engaging flange 27. A spring 28 is secured to the member 24 and causes the flange 27 to exert a yielding pressure against the passing container, and an adjustable stop 29 limits the inward movement.

The pressure members 24 are accurately adjusted to correspond to the width of the containers handled and inclined surfaces 30 on the engaging flanges 27, together with the springs 28, allow the containers to be forced between the pressure members and the edges of the flaps snugly pressed together, the flaps being simultaneously held in sealed position by the centrally supported top and bottom retaining plates 31 and 32, respectively.

While a single embodiment of this invention is herein shown and described, it is to be understood that various modifications may be made without departing from the spirit of the invention, and I desire, therefore, to be limited only by the prior art and the scope of the appended claims.

Having thus described my invention, what I claim and desire to secure by Letters Patent is:

1. A device of the character described comprising a container guide for freshly glued and closed containers, and supplemental means on said guide for changing the relative position of the freshly glued and closed parts of said containers.

2. A container sealer comprising a plurality of guide rails, means for adjusting the relative position of said rails to guide containers of various dimensions, folders on said rails and adjustable therewith for folding the freshly glued flaps of all of said containers to a slightly separated closed position, and means on said rails and adjustable therewith to close the edges of said separated flaps.

3. A container sealer comprising a plurality of guide rails, means for adjusting the relative position of said rails to guide containers of various dimensions, folders on said rails and adjustable therewith for folding the freshly closed flaps of all of said containers to a slightly separated position, spring pressed means adjustable therewith to close the edges of said separated flaps, and means for independently adjusting said last means.

4. A container sealer comprising longitudinally and rectangularly disposed container guides, means for moving containers therebetween, folders for closing the freshly glued flaps of said containers, means for adjusting the rectangular position of said guides, and independently adjustable yielding means movable with said guides for providing lateral pressure on said flaps after closing.

5. A guide rail for container sealers comprising a bar adapted to loosely engage the side of a moving closed container, a supplemental guide member pivoted thereon, and means to cause said supplemental member to exert a yielding pressure against said moving container.

6. A container sealer comprising longitudinally and rectangularly disposed container guide rails, means for moving containers therebetween, folders on said rails for sealing the freshly glued flaps of said containers, means for adjusting the relative rectangular position of said rails and folders, yielding supplemental guides pivoted on said rails and extending beyond the guiding face thereof, and means for adjusting the position of said supplemental guides relative to said rail face.

In witness whereof, I have hereunto subscribed my name.

JOHN L. FERGUSON.